United States Patent
Yamauchi et al.

(10) Patent No.: US 6,510,122 B1
(45) Date of Patent: Jan. 21, 2003

(54) DISK DRIVE DEVICE

(75) Inventors: Yoshiaki Yamauchi, Ibaraki-ken (JP); Hisahiro Miki, Chigasaki (JP); Shigeki Mori, Yokohama (JP); Shinobu Yoshida, Tsuchiura (JP); Takashi Kouno, Ibaraki-ken (JP); Yoshihiro Sato, Ibaraki-ken (JP); Kuniyuki Kimura, Fujisawa (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 09/210,544

(22) Filed: Dec. 14, 1998

(30) Foreign Application Priority Data

Dec. 19, 1997 (JP) .............................................. 9-350502

(51) Int. Cl.$^7$ ............................................. G11B 17/02
(52) U.S. Cl. ...................................................... 369/266
(58) Field of Search ........................... 360/99.12, 97.02, 360/98.07, 98.08, 99.04; 369/258, 263, 266; 310/262, 51; 74/573 R, 572; 68/73.2

(56) References Cited

U.S. PATENT DOCUMENTS

| | | | |
|---|---|---|---|
| 5,111,713 A | * 5/1992 | Cameron et al. | 74/573 |
| 5,613,408 A | * 3/1997 | Taylor et al. | 74/572 |
| 5,806,349 A | * 9/1998 | Kim et al. | 68/23.2 |
| 5,880,904 A | * 3/1999 | Mizoshita et al. | 360/256 |
| 6,005,311 A | * 12/1999 | Matsushima | 310/51 |
| 6,005,749 A | * 12/1999 | Ikuta et al. | 360/99.12 |
| 6,025,973 A | * 2/2000 | Mizoshita et al. | 360/99.08 |
| 6,065,368 A | * 5/2000 | Sohn | 188/267 |
| 6,155,134 A | * 12/2000 | Ikuta et al. | 369/263 |
| 6,198,715 B1 | * 3/2001 | Kouno et al. | 369/247 |
| 6,219,328 B1 | * 4/2001 | Kume et al. | 369/269 |

FOREIGN PATENT DOCUMENTS

| | | | |
|---|---|---|---|
| JP | 58133673 A | * | 8/1983 |
| JP | 9-312058 | * | 12/1997 |
| JP | 10-124990 | * | 5/1998 |
| JP | 10-162539 | * | 6/1998 |
| JP | 10257710 A | * | 9/1998 |
| JP | 11134786 A | * | 5/1999 |
| JP | 12030355 A | * | 1/2000 |

* cited by examiner

*Primary Examiner*—Hoa T. Nguyen
*Assistant Examiner*—Tianjie Chen
(74) *Attorney, Agent, or Firm*—Antonelli, Terry, Stout & Kraus, LLP

(57) ABSTRACT

Disk storage devices have exhibited an increase in rotational vibrations which attend high speed rotation due to weight unbalance of a disk. Accordingly, an unbalance correcting mechanism, provided with correcting balls to correct the aforesaid unbalance, meets a problem that the correcting balls are made unstable at the time of low speed rotation to generate vibrations and noises. A disk drive device is provided with an unbalance correcting mechanism comprising an annular-shaped groove provided in a turntable on a spindle motor and a plurality of correcting balls received in the groove, and in which a sliding resistance member is provided on a bottom surface of the annular-shaped groove to suppress a sliding resistance of the correcting balls on the sliding resistance member, and a correcting ball motion auxiliary member is provided on an inner peripheral side wall of the groove (toward an axis of rotation).

3 Claims, 4 Drawing Sheets

DISK DRIVE DEVICE

BACKGROUND OF THE INVENTION

The present invention relates to a disk drive device for rotating a disk-shaped replaceable storage medium at high speed for reproduction of or recording and reproduction of information, and more specifically to a disk drive device suitable for high speed rotation of disks including CD-ROM, DVD-ROM, DVD-RAM, MO, removable HDD and so on.

In conventional CD-ROM drive devices, causes for lowering positional accuracy are classified into two kinds: (1) vibrations caused by a spindle driving system and a pickup driving system, and (2) disturbing vibrations transmitted from the outside. Typical examples of the cause of the kind (1) includes vibrations due to unbalance of a rotating system, electromagnetic vibrations of a motor, and driving reaction force of the pickup driving system. One of the most important subjects in designing such devices is to ensure a required positioning accuracy despite of such causes for lowering positioning accuracy.

In particular, data transfer has recently been effected at high speed and so attended by high speed rotation of a disk, which involves vibrations due to unbalance of the above-mentioned rotating system.

Japanese Patent Unexamined Publication No. 3-86968 discloses, as a proposal for suppressing the vibrations due to unbalance, a magnetic disk device provided with an endless cylindrical balancing case, in which a fluid is filled to be movable, and which is mounted on an outer peripheral portion of a spindle part in such a manner as to be coaxial with a magnetic disk.

Data transfer speed has been increased in a disk drive device, which must deal with multi-media having a large volume of images and moving image information. High speed data transfer in a disk drive device can be achieved by (1) increasing the rotational speed of a disk and (2) increasing a signal detecting frequency of a servo system. In recent years, therefore, the above measure (1) has rapidly promoted high speed operation of spindle motors.

A problem associated with high speed rotation of a spindle motor is an increase in vibrations due to unbalance of a rotating system. In optical disk drive devices such as CD-ROM drive devices and the like, a disk serving as storage medium is characteristically replaceable. Disks are manufactured in large quantities by pressing, and so involve dispersion in thickness and concentricity between a clamp inside diameter and a disk outside diameter. Further, weight unbalance is caused due to printing of characters and patterns on a disk or to a label or the like applied on the disk for identification of the disk.

When a disk with such unbalance is rotated, unbalance vibration occurs due to inconsistency between a center of gravity of and an axis of rotation of a rotating system. A force F for generating such unbalance vibration is expressed by the following formula $$F = m \cdot \epsilon \cdot \omega^2 \qquad (1)$$

where $\epsilon$ is a distance between the center of gravity of and the axis of rotation of the rotating system, m is a mass of a rotating body, and $\omega$=a rotational frequency.

As seen from the formula (1), unbalance vibration is in proportion to the square of a rotational frequency, so that high speed rotation sharply increases the unbalance vibration. The unbalance vibration not only causes vibration of an optical pickup system to impede read/write of signals, but also causes generation of noises and vibration of a system itself, to which the device is mounted, thus remarkably lowering reliability of the system itself.

By the way, keeping step with the tendency of high speed data transfer, the disk rotation speed is becoming higher. In a 24× speed or 32× speed CD-ROM drive, for example, a disk is rotated at 5,000 to 7,000 rpm, which raises a problem of disk unbalance vibration as mentioned above.

To cope with this, there has been proposed an arrangement, in which a disk rotating mechanism is provided with an unbalance correcting mechanism comprising an annular-shaped groove and correcting bodies (correcting balls) adapted to roll within the groove. With this arrangement, a range of rotational frequency adequately exceeding the resonance point of elastic members supporting a driving system is used for operation, but forces acting on the correcting bodies become unstable around the resonance point such that, when the correcting bodies begin rolling within the groove, they will never stop rolling, and so vibrations caused due to rolling of the correcting bodies become problematic. Further, in the case where the disk rotation speed is low and the device is set vertical, dead loads on the respective correcting bodies are greater than centrifugal forces generated by rotation, resulting in a phenomenon that the correcting bodies fail to rise along the annular groove and behave violently in a lower part of the groove.

OBJECT AND SUMMARY OF THE INVENTION

An object of the present invention is to provide a low vibration mechanism for rotation driving systems, which tend to be operated at high speed, and for suppressing vibrations produced at the time of low speed rotation and ensuring reliability in a disk drive device having a built-in unbalance correcting mechanism, such as CD-ROM drives of high data transfer.

In order to achieve the above object, the invention provides a disk drive device comprising a rotation driving mechanism for rotating a disk-shaped storage medium having an information recording surface, a head for at least reading an information on the storage medium, support members holding a base plate, on which the rotation driving mechanism and the head are mounted, correcting members for correcting unbalance of rotatingly movable parts including the storage medium, an unbalance correcting mechanism having a rolling groove in the rotation driving mechanism, and auxiliary member or members provided in the rolling groove for increasing or reducing rolling and sliding resistances of the correcting members on surfaces in the rolling groove, the auxiliary member or members making rolling and sliding resistances of the correcting members different between an outer side surface of the rolling groove, which serves as a track surface for the correcting members, and a bottom surface of the rolling groove. The rolling and sliding resistances of the correcting members on the bottom surface of the rolling groove are made larger than the rolling and sliding resistances of the correcting members on the outer side surface of the rolling groove.

Further, a rolling motion auxiliary member or members are provided in the rolling groove for assisting in rolling motion of the correcting members. The rolling motion auxiliary member or members comprise an annular-shaped elastic member or members provided at an outer side surface thereof with or without irregularities, and is provided on an inner peripheral side surface of the rolling groove.

DESCRIPTION OF THE EMBODIMENTS

Figure 1:
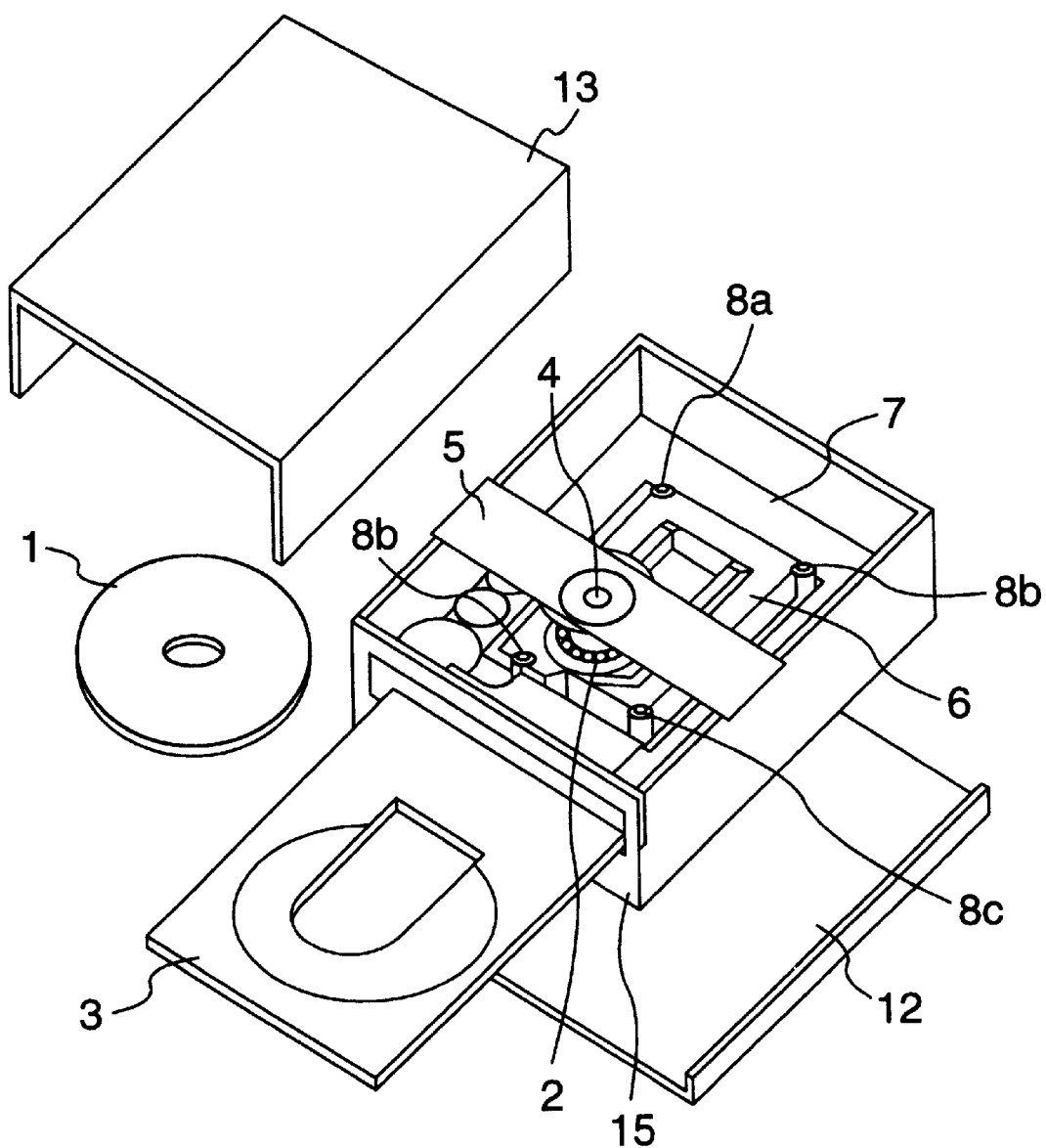
FIG. 1 is an exploded perspective view of an optical disk drive device according to an embodiment of the present invention.

FIG. 1 shows an appearance of a disk (CD-ROM) drive device according to an embodiment of the present invention.

An optical disk unit acts such that a disk tray 3, which places thereon a disk 1, is caused by a disk loading mechanism (not shown) to project from an opening formed in a front panel 15 of the disk unit so that the disk 1 being a storage medium is charged into (or ejected from) the disk unit. In this state, the disk 1 is placed on the disk tray 3 thus projected. Then, the disk loading mechanism causes the disk tray 3 to be charged into the disk unit together with the disk 1.

Thereafter, the disk 1 is fixed on a turntable 2 by magnetic attraction generated from a disk damper 4, which is mounted on a clamper holder 5 above the turntable 2 serving as a disk holding base provided on a spindle motor constituting a disk driving mechanism. Subsequently, the spindle motor starts rotating the disk 1 at the prescribed rotational speed so that data recorded on the disk 1 is reproduced by means of an optical head (not shown) installed on a unitary mechanical chassis 6 provided below the disk 1.

The optical head is equipped with an objective lens operation device, and is incorporated in a moving mechanism so as to be able to move in a radial direction of the disk 1. The objective lens operation device is held by the unitary mechanical chassis 6 being a mounting base. In addition, the disk driving mechanism is mounted on the unitary mechanical chassis 6 as well. The unitary mechanical chassis 6 is elastically supported on a unit holder 9 (not shown in FIG. 1) by screws and vibration isolating posts 8a, 8b, 8c, 8d, which are support members made of an elastic material, and screws. The unit holder 9 is joined to a mechanical base 7 in a manner, in which the both parts are fitted directly on each other.

In the present invention, an unbalance correcting mechanism for automatically correcting unbalance involved in a rotating body including the disk 1 is provided in the turntable 2 of the spindle motor for the purpose of improving a vibration isolating performance of such optical disk unit at the time of high speed rotation of the disk. Furthermore, the present invention has solved an unstable behavior encountered just over the resonance frequency of the vibration isolating posts while the disk rotational speed is increased to the prescribed speed, as well as problems caused when the device is set vertical. It goes without saying that this construction can be applied to a disk write device or a disk write/read device.

The disk read device, disk write device, and disk read/write device will be described hereinbelow. A disk 1 used for CD-ROM and DVD drive devices is characteristically replaceable. Accordingly, disks 1 are manufactured in large quantities by pressing, which cannot provide so high manufacturing accuracy such that disk thickness and degree of concentricity between an inner diameter for clamping and an outer diameter of a disk vary widely. Further, weight unbalance of the disks 1 is not negligible which generates due to printing of characters and patterns on the disk or due to a label or the like applied on the disk by a user for identification.

As described above, the disk 1 itself involves weight unbalance, and so actually involves a maximum weight unbalance of a magnitude of about 1 gcm. When such disk 1 is rotated at high speed, the spindle motor supporting the disk 1 is exerted by an unbalanced load which is remarkably increased with rotation. Vibration of primary component from rotation of the disk 1, caused due to the unbalanced load, is propagated through the spindle motor to the unitary mechanical chassis 6, thus leading to vibration of the device itself or noises due to the mutual contact, interference and the like between various parts.

The present embodiment aims at reducing vibration due to the aforesaid disk unbalance at the time of high speed rotation, and aims at solving the unstable behavior encountered just over the resonance frequency of the vibration isolating posts 8a, 8b, 8c, 8d, as well as the problems caused when the device is set vertical for writing, and at the time of low speed rotation.

Now, description will be given of a disk unbalance correcting mechanism according to the present invention.

Figure 2:
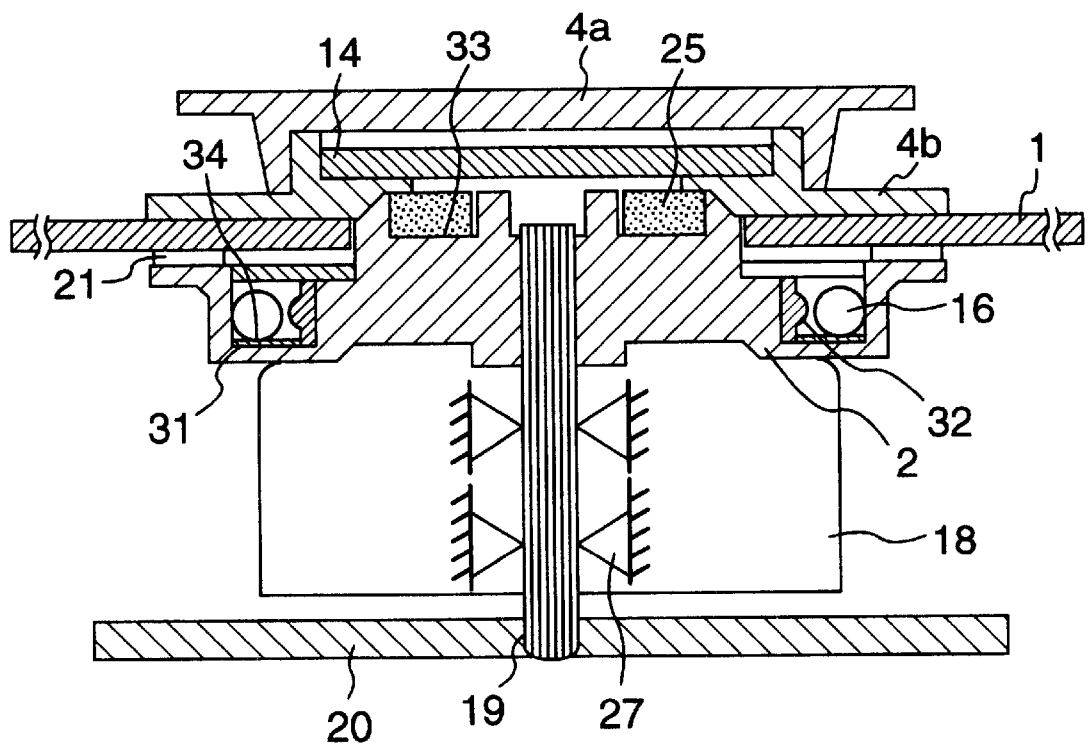
FIG. 2 is a sectional view of a spindle motor having a built-in disk unbalance correcting mechanism according to an embodiment of the invention.

FIG. 2 is a cross sectional view showing a disk rotating system (comprising a spindle motor, a disk 1 and a disk damper 4) having a disk unbalance correcting function according to an embodiment of the invention.

The disk rotating system in the optical disk device comprises a spindle motor, a disk 1 being a disk-shaped storage medium, and a disk damper 4 for fixing the disk 1 on a turntable 2. The spindle motor comprises the turntable 2 for holding the disk 1, a shaft 19 being a rotary shaft press-fitted in the turntable 2, and a rotor section 18 fixed on the shaft 19. Inside the rotor section 18, a magnetic circuit is formed which imparts a rotating driving force to the spindle motor, and a cylindrical-shaped multipolarised magnet is mounted to the rotor section 18 constituting a rotary section. Inside the rotor 18, a core and a coil constituting a stationary section are fixed on a stator base plate 20. The shaft 19 is rotatably supported by the stationary section by means of ball bearings, slide bearings 27 or the like. Further the stationary section is fixed on the stator base plate 20, to which a spindle motor control board is applied.

Here, description will be given of a structure of the turntable 2 of the spindle motor having the built-in disk unbalance correcting mechanism shown in FIG. 2. The turntable 2 is formed therein with a first annular groove 33 in which an annular disk fixing magnet 25 is mounted. With the disk 1 set on the turntable 2, the disk damper 4 interposes the disk 1 between it and the turntable 2 from above to fix the disk 1. This fixing is performed by making use of a magnetic attraction existing between the fixing magnet 25 and a facing, attracting iron plate 14 in the disk damper 4. The turntable 2 is further formed therein with a second annular groove 34 which is radial outwardly of the first annular groove 33 and receives spherical correcting members 16 for correcting unbalance of the disk.

Vibrations caused due to unbalance of the disk 1 are affected by orbiting movements of the shaft 19 to act in the radial direction of the disk. In the case where the unbalance correcting mechanism is built in the turntable 2, a centrifugal force caused by the above-described correcting member 16 acts in a radial direction of the disk for rotation. These two forces can act substantially in one plane, and so can correct the unbalance without causing any turning moment on the shaft 19. Further, the second annular groove 34 formed in the turntable 2 is completely fixed on the shaft 19 being a rotary shaft, so that it can be easily machined concentrically with respect to the rotary shaft and be less eccentric with respect to the rotation axis. Such correcting members 16 provided in the annular groove comprise at least two spherical steel balls. These correcting members 16 will be referred to as "correcting ball" hereinafter.

Here, the principles of unbalance correction using the correcting balls 16 will be described.

The correcting balls 16 are enabled to roll freely in the annular groove. As shown in FIG. 1, the unitary mechanical chassis system 6 including the disk 1, spindle motor and the optical pickup 11 is elastically supported by the unit holder 9. The elastic support system employs the vibration isolating posts 8a, 8b, 8c and 8d. Assuming that the resonance frequency of the support system is ωn, after the spindle motor starts to rotate, the correcting balls 16 are moved in the direction of disk unbalance by the centrifugal force resulting from rotation as far as the rotational frequency ω is less than the resonance frequency ωn (ωn>ω). The elastic support system composed of the vibration isolating posts 8a, 8b, 8c and 8d is a primary vibration system. When the resonance point is exceeded, the phase undergoes inversion by 180 degrees, so that a force in the direction opposite to the disk unbalance acts on the correcting balls 16 when the spindle motor is rotated at a rotational frequency ω exceeding the resonance frequency ωn of the support system. In consequence, when the rotational frequency of the spindle motor is in the range of ωn<ω, the correcting balls 16 are moved in such a direction as to correct the unbalance.

As described above, the unbalance vibration occurring at the time of high speed rotation can be suppressed on the basis of the above principles. However, with the unbalance vibration control mechanism provided with the correcting balls 16, movements of the balls or the like causes vibrations to occur up to the high speed rotation, and so it is not possible to solve a problem that such vibrations are propagated to a casing and the like, thus giving uncomfortable feelings to a user. To cope with this, a construction for suppressing vibration which could occur up to the high speed rotation will be described in the following.

In the case of the disk 1 having unbalance, the orbiting amplitude of the drive mechanism becomes large when the resonance point of the rotating system supported by the vibration isolating posts 8a, 8b, 8c, 8d shown in FIG. 1 is exceeded. Since the phase undergoes inversion at the resonance point of the vibration isolating posts 8a, 8b, 8c, 8d as described above, the correcting balls 16 in the second annular groove 34 ideally move in such a direction as to suppress the unbalance of the disk 1, but the correcting balls 16 actually behave in such a manner as to move while rolling along the side surface of the groove (track surface) and slide on the bottom surface of the groove.

For this reason, the correcting balls 16 are brought into an unstable condition by resistances to the rolling or sliding motion thereof. In particular, if the sliding resistance between the correcting balls 16 and the bottom surface of the groove is small, the correcting balls 16 becomes unstable in behavior.

Figure 3:
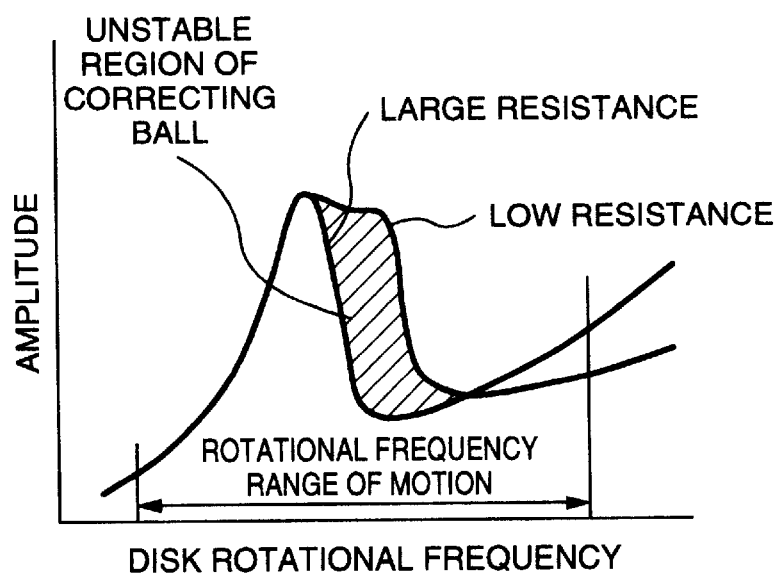
FIG. 3 is a graph showing the relationship between a disk rotation speed and an orbiting amplitude of a drive mechanism.

FIG. 3 is a graph showing the relationship between the disk rotation speed and the orbiting amplitude of the drive mechanism for the difference in the sliding resistance between the correcting balls 16 and the bottom surface of the annular groove 34.

In the case where the sliding resistance is large, the unstable condition of the correcting balls 16 is suppressed by the sliding resistance on the bottom surface, with the result that the correcting balls 16 are set in the ideal condition immediately over the resonance point of the vibration isolating posts 8a, 8b, 8c, 8d, so that the orbiting amplitude of the drive mechanism is made small. On the contrary, in the case where the sliding resistance on the bottom surface of the groove is small, the correcting balls 16 are in the unstable condition (that is, starting of rolling becomes unstable), so that the orbiting amplitude of the drive mechanism is not reduced when the resonance point of the vibration isolating posts 8a, 8b, 8c, 8d is exceeded.

As a concrete means for suppressing such vibration, with the unbalance correcting mechanism according to the invention shown in FIG. 2, a sliding resistance member 31, which serves as an auxiliary member for imparting the sliding resistance to the correcting balls 16, is provided on the bottom surface portion of the second annular groove 34 formed in the turntable 2. When the disk is rotated, the correcting balls 16 are caused by the action of a centrifugal force to roll along the outer peripheral side surface of the groove (track surface), and so it is desirable to reduce the rolling resistance of the balls to the track surface as small as possible. Therefore, it is required that the sliding resistance of the balls to the groove bottom surface be larger than the rolling resistance of the balls to the track surface. The sliding resistance member 31 on the bottom surface of the groove may comprise a thin seal of elastic material bonded to the bottom surface. Alternatively, grease may be applied as a solid lubricant on the bottom surface. Use of such means enables the correcting balls 16 to act in a stable manner after the resonance point of the vibration isolating posts 8a, 8b, 8c, 8d is passed. Furthermore, the impact forces on the annular groove 34 and the correcting balls 16 can be relieved to improve reliability with respect to surface abrasion, service life and the like.

Next, the behavior of the correcting balls 16 in the case where the device is set vertical (or set on its edge) will be described. The correcting balls 16 are moved to the outer peripheral side surface of the groove 34 by the action of the centrifugal force resulted from the rotating force of the spindle motor. In the event of the device being set vertical, centrifugal forces and tare weight are exerted on the correcting balls 16. If the rotational frequency of the spindle motor is low, the centrifugal force exerted on the correcting balls 16 becomes smaller than the tare weight, so that the correcting balls 16 cannot reach the top of the annular groove 34, in which case a plurality of the correcting balls 16 will collide with each other in the lower portion of the groove, thus making noises such as the sound of collision.

To cope with this, provided on the inner peripheral side surface of the second annular groove 34 formed in the turntable 2 shown in FIG. 2 is a correcting ball motion auxiliary member 32 as another auxiliary member which holds the correcting balls 16 stably under the influence of the centrifugal force at the time of low speed rotation in the event of the device being set vertical. The function of the correcting ball motion auxiliary member 32 will be described with reference to FIG. 4.

Figure 4:
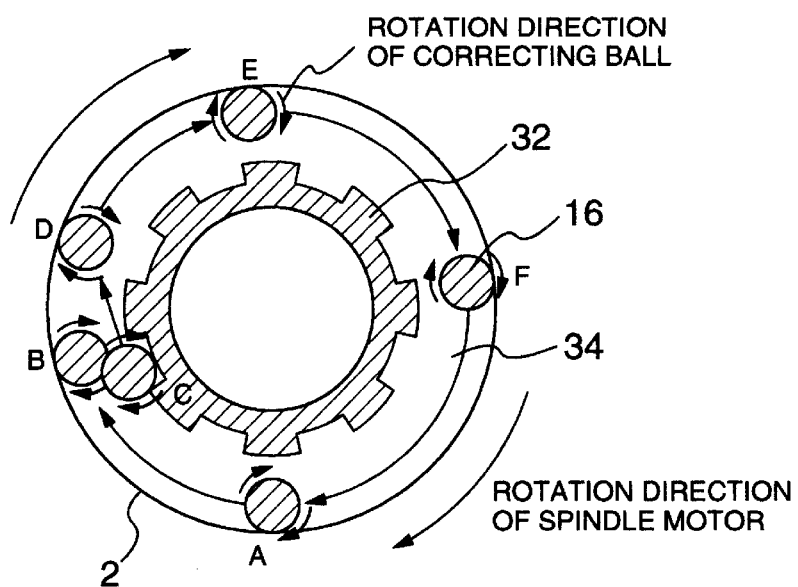
FIG. 4 is a view showing a rolling groove with a correcting ball motion auxiliary member and an action of the correcting ball when the device is set upright and the rotational frequency is low.

FIG. 4 shows an action of the rolling groove 34 of the unbalance correcting mechanism of the invention, in which the correcting ball motion auxiliary member 32 is employed, and the correcting balls 16 at the time of low speed rotation in the event of the device being set vertical on the assumption that the number of the correcting balls 16 is one.

As shown in FIG. 4, the correcting ball motion auxiliary member 32 according to this embodiment is provided on the inner peripheral side surface of the annular groove 34 (near the axis of rotation).

When the spindle motor starts to rotate, the correcting ball 16 moves from an initial position A to a position B while rolling in the illustrated rolling direction under the influence of the centrifugal force. At this time, the tare weight of the correcting ball 16 becomes larger than the centrifugal force to cause the correcting ball 16 to move toward a position C. In the position C as well, the correcting ball 16 rolls in the aforesaid rolling direction and runs on the projecting portion of the correcting ball motion auxiliary member 32 of this embodiment to move to a position D. Since the rolling direction of the correcting ball 16 is the same as the direction of rotation of the spindle motor, the correcting ball 16 is permitted to return to the position A via positions E and F without bouncing on the side surface of the annular groove 34 provided in the turntable. At this point, an inertial force acts on the correcting ball 16, and so the correcting ball 16 continues to rotate stably along the track surface without falling due to its own weight even in the position B. In this embodiment, a repulsive force exerted by the projecting portion of the correcting ball motion auxiliary member 32 causes the correcting balls 16 to act, while the same effects can also be obtained when frictional forces cause the correcting balls 16 to run on the projecting portion of the correcting ball motion auxiliary member 32.

In addition, the correcting ball motion auxiliary member 32 is magnetized partially (in its concave portions) or entirely to surely hold the correcting balls 16 in the low speed range. Moreover, by manufacturing the correcting ball motion auxiliary member 32 such that the such magnetic force becomes smaller than the centrifugal force generated at the time of high speed rotation, the correcting balls 16 can revolve away from the correcting ball motion auxiliary member 32 to ensure stability.

Figure 5A:
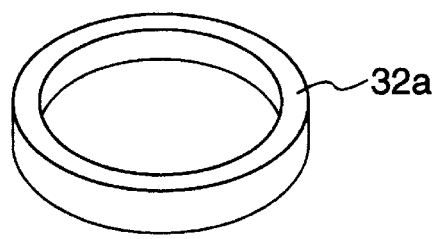
FIGS. 5A, 5B and 5C are illustrations showing the configurations of the correcting ball motion auxiliary member according to an embodiment of the invention.
Figure 5B:
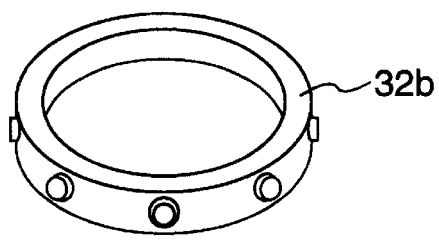
Figure 5C:
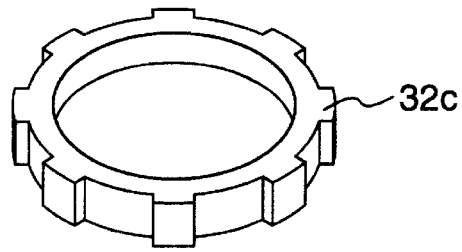

FIGS. 5A, 5B and 5C show configurations of the correcting ball motion auxiliary member 32 according to one embodiment of the invention. FIG. 5A shows an annular-shape correcting ball motion auxiliary member 32a having any irregularities on an outer peripheral surface thereof. In this case, frictional forces between the correcting balls 16 and the annular-shaped outer peripheral surface take effect. Frictional forces generated by a property of a material, frictional forces generated by roughness of the side surface, or magnetic forces may be used to take effect. FIG. 5B shows a correcting ball motion auxiliary member 32b having round projections circumferentially on its side surface. FIG. 5C shows a correcting ball motion auxiliary member 32c having steps on its side surface. The member shown in FIG. 5C can be formed with greater ease than that shown in FIG. 5B. If such correcting ball motion auxiliary member 32 is made of, for example, urethane rubber, the correcting balls 16 will never be injured and so become hard to wear, thus improving reliability as well as making even durability of the correcting ball motion auxiliary member 32 favorable.

Figure 6A:
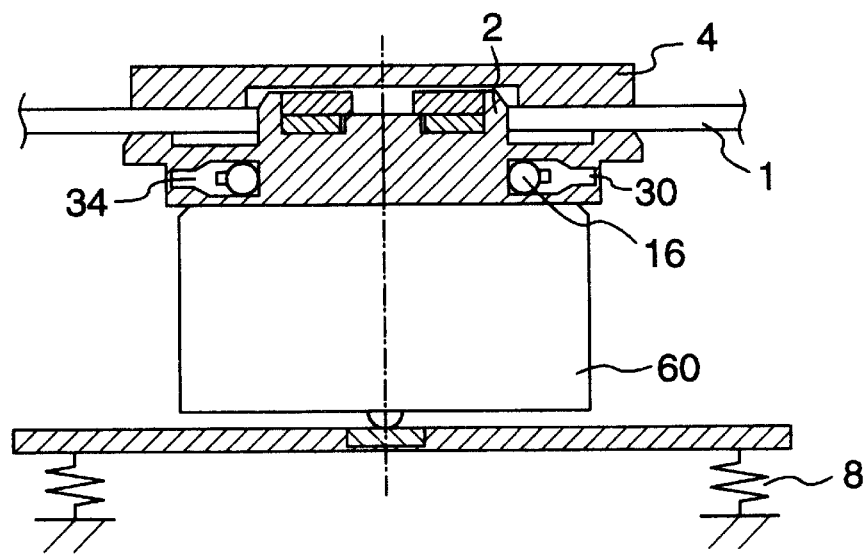
FIG. 6A shows a spindle motor with disk unbalance correcting mechanism according to another embodiment of the invention.
Figure 6B:
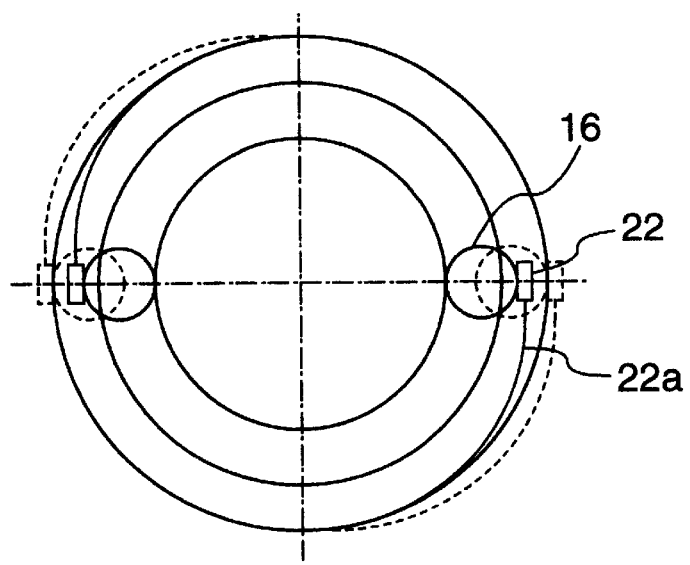
FIG. 6B is an illustration of the unbalance correcting mechanism portion of FIG. 6A as viewed from above.
Figure 6C:
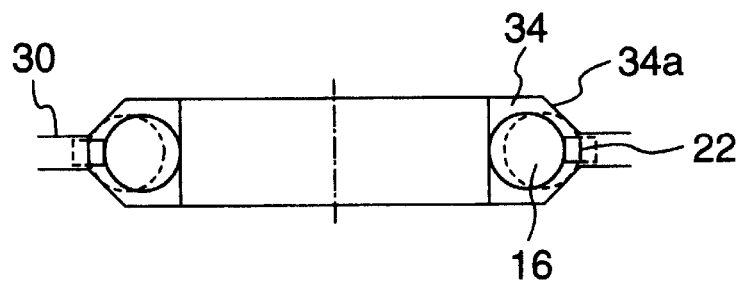
FIG. 6C is a sectional view of an unbalance correction groove of FIG. 6A.

FIGS. 6A, 6B and 6C show another embodiment of the present invention. In this embodiment, the outer peripheral side surface of an annular groove 34 is formed to have a V-shaped cross-sectional profile, and an elastic member such as a leaf spring or the like provided with a holding portion 22 is provided on the outer peripheral side surface of the annular groove to serve as the correcting ball motion auxiliary member shown in FIG. 2, and to hold the correcting balls 16 in the low speed range. Further, a turntable is provided on the top of a spindle motor 60.

The outer peripheral side surface of the annular groove 34 is in the form of a V-shaped groove as described above, whereby the sliding friction of the correcting balls 16 to the rolling surface is reduced. Further, the sliding resistance member 31 is provided on the bottom surface of the annular groove in the same manner as the embodiment of FIG. 2, thus enabling improving an effect described hereinbelow.

If a surface, on which the correcting balls 16 roll were flat, the correcting balls 16 would be brought into contact with the rolling surface and the bottom surface of the annular groove such that they slide on the bottom surface of the rolling part to generate sliding frictional forces between the correcting balls and the bottom surface of the rolling part, which forces would adversely affect the correction of unbalance. In contrast, if the side surface being the rolling surface for the correcting balls are formed to be in the form of a V-shaped groove, only a rolling frictional force acts between the correcting balls and the rolling surface, and so no sliding frictional force is caused to adversely affect the correction of unbalance. The V-shaped groove 34a is formed in an outward direction of the rolling surface for the correcting balls 16, so that the correcting balls 16 are made to roll with its upper and lower two points kept in contact with the V-shaped groove 34a. It is desired that an opened angle of the V-shaped groove 34a be equalized with respect to the direction of centrifugal force, which is exerted on the correcting balls 16.

A holding portion 22 of the correcting ball motion auxiliary member for holding the correcting balls 16 is provided on the tip ends of the elastic bodies 22a such as a leaf spring which are provided so as to exert forces toward the axis of rotation. The elastic bodies 22a are mounted on a deep portion 30 of the V-shaped groove 34a to fix the correcting balls 16 with the holding portions 22. Incidentally, it goes without saying that the elastic bodies 22a may be made of rubber and the like. Further, with a modified arrangement, the springs described above are made to act radially outwardly of the turntable, the holding portions 22 are made of a magnetic material or a magnet, and magnets or magnetic bodies are provided on sides of the correcting balls 16 toward the center of rotation and opposite to the holding portions 22, whereby the holding portions 22 are displaced near the axis of rotation under the influence of magnetic force at the time of low speed rotation and are displaced near the outer peripheral side of the turntable at the time of high speed rotation, thereby enabling holding or releasing the correcting balls 16 from the holding portions 22. In addition, the elastic force of the elastic bodies 22a is made smaller than the centrifugal force generated at the time of rotation at speeds higher than or equal to a predetermined speed. More specifically, when the rotational frequency is at most the point where the vibration isolating posts 8a, 8b, 8c, 8d are resonant, the correcting balls 16 are fixedly pushed against the inner peripheral side surface of the annular groove 34 (toward the axis of rotation) as shown by solid lines in FIGS. 6B and 6C. When the rotational frequency exceeds the resonance point of the vibration isolating posts 8a, 8b, 8c, 8d, the centrifugal force becomes larger than the elastic force of the elastic bodies 22a to cause the holding portions 22 to retreat outward in the V-shaped groove 34a, so that the correcting balls 16 are permitted to freely roll along the rolling surface as shown by dotted lines in FIGS. 6B and 6C. Such arrangement provides the same effect as in the case where an apparent frictional force of the correcting balls 16 is made large at the time of low speed rotation and a frictional force is made small at the time of high speed rotation. In consequence, accuracy can be ensured for the outer side surface of the annular groove 34, and a force applied to the correcting balls is generated only from the rolling friction, thus enabling reducing the frictional force. Further, the device can be made simple in construction, which enables ensuring reliability.

As has been described above, the disk drive device according to the invention enables automatically correcting the unbalance of the rotating system including disk unbalance, and reducing vibrations due to unbalance generated from the rotating system. Further, noises resulted from vibrations produced in the process of unbalance correction can be reduced. Therefore, it is possible to suppress errors in focussing and tracking, caused by the vibrations due to unbalance, and to reduce vibrations or noises generated from the device. Moreover, the disk drive device employing the unbalance correcting mechanism of the invention can cope with faster disk rotation speeds and realize highly accurate positioning accompanying higher recording densities. In addition, a disk drive device can be realized which has stable performances for vibrations or noises generated from the device when the disk is rotated at low speed.

What is claimed is:

1. A disk drive device comprising:

a rotation driving mechanism for rotating a disk-shaped storage medium having an information recording surface; a head for at least reading an information on said storage medium;

support means composed of elastic members holding a base plate, on which said rotation driving mechanism and said head are mounted;

an unbalance correcting mechanism for correcting unbalance of rotatingly movable parts including said storage medium, said unbalance correcting mechanism being provided with a rolling groove and correcting means rollingly movable within said groove; and rolling motion auxiliary means provided in said rolling groove for assisting in rolling motion of said correcting means, wherein said auxiliary means comprises an annular-shaped elastic member provided at an outer side surface thereof with or without irregularities, and is provided on an inner peripheral side surface of said rolling groove.

2. A disk drive device comprising:

a rotation driving mechanism for rotating a disk-shaped storage medium having an information recording surface;

a head for at least reading an information on said storage medium; support means composed of elastic members holding a base plate, on which said rotation driving mechanism and said head are mounted;

an unbalance correcting mechanism for correcting unbalance of rotatingly movable parts including said storage medium, said unbalance correcting mechanism being provided with a rolling groove and correcting means rollingly movable within said groove; and rolling motion auxiliary means provided in said rolling groove for assisting in rolling motion of said correcting means, wherein said auxiliary means is provided on an inner peripheral side surface of said rolling groove, and further wherein said auxiliary means comprises an annular-shaped magnetic member provided at an outer peripheral side surface thereof with irregularities.

3. A disk drive device comprising:

a rotation driving mechanism for rotating a disk-shaped storage medium having an information recording surface;

a head for at least reading an information on said storage medium; support means composed of elastic members holding a base plate, on which said rotation driving mechanism and said head are mounted;

an unbalance correcting mechanism for correcting unbalance of rotatingly movable parts including said storage medium, said unbalance correcting mechanism being provided with a rolling groove and correcting means rollingly movable within said groove; and rolling motion auxiliary means provided in said rolling groove for assisting in rolling motion of said correcting means, wherein said rolling motion auxiliary means at least assists in rolling motion of said correcting means in said rolling groove at a low speed rotation of said rotation driving mechanism which is less than a predetermined speed of rotation.

* * * * *